United States Patent
Yamamoto et al.

(10) Patent No.: US 11,370,039 B2
(45) Date of Patent: Jun. 28, 2022

(54) DRILL

(71) Applicant: OSG CORPORATION, Toyokawa (JP)

(72) Inventors: Takahiro Yamamoto, Toyokawa (JP); Hiroyasu Makino, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 0 days.

(21) Appl. No.: 16/645,239

(22) PCT Filed: Sep. 7, 2017

(86) PCT No.: PCT/JP2017/032266
§ 371 (c)(1),
(2) Date: Mar. 6, 2020

(87) PCT Pub. No.: WO2019/049257
PCT Pub. Date: Mar. 14, 2019

(65) Prior Publication Data
US 2020/0282472 A1   Sep. 10, 2020

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/14* (2013.01); *B23B 2251/18* (2013.01)

(58) Field of Classification Search
CPC .......... B23B 2251/08; B23B 2251/082; B23B 2251/14; B23B 2251/18; B23B 2251/20; B23B 2251/202; B23B 51/02; B23B 51/06

See application file for complete search history.

(56) References Cited

U.S. PATENT DOCUMENTS 2,936,658 A  *  5/1960  Riley ..................... B23B 51/02
                                                    408/230
5,716,172 A       2/1998  Nakamura
(Continued)

FOREIGN PATENT DOCUMENTS

CN          104755211 A      7/2015
CN          205464473 U      8/2016
(Continued)

OTHER PUBLICATIONS

English translation of International Search Report of International Application No. PCT/JP2017/032266.
(Continued)

*Primary Examiner* — Chwen-Wei Su
(74) *Attorney, Agent, or Firm* — Muncy, Geissler, Olds & Lowe, P.C.

(57) ABSTRACT

Two discharge grooves (4) are formed in a drill (1). A cutting edge (5) is formed on a ridge section between an inner face (41) that faces a rotation direction (T) side of the discharge groove (4), and a flank (6). A thinning edge (7) is formed from an inner end (51) of the cutting edge (5) to the side of a chisel (9), by thinning processing, and further, a gash portion (8) is formed from an inner end (72) of the thinning edge (7), the gash portion extending in a circular arc shape and being connected to the discharge groove (4) further to an inner side in the radial direction than an outer peripheral surface (31). A circular arc groove (10) is formed in a section connecting a thinning face (71) and a gash face (81). The chips being cut by the thinning edge (7) are scooped up to the gash portion (8), are curled, and are discharged to the discharge groove (4). The chips are not likely to become caught by being provided with the circular arc groove (10). Since the gash portion (8) connects to the discharge groove (Continued)

(4) further to the inner peripheral side than the outer peripheral surface (31), the chips are cut relatively small.

3 Claims, 18 Drawing Sheets

(56) References Cited

U.S. PATENT DOCUMENTS

| | | | |
|---|---|---|---|
| 6,916,139 B2* | 7/2005 | Yanagida | B23B 51/02 408/230 |
| 10,413,976 B2* | 9/2019 | Ogawa | B23B 51/02 |
| 2007/0134071 A1* | 6/2007 | Reinhardt | B23B 51/02 408/230 |
| 2010/0028098 A1 | 2/2010 | Shaffer | |
| 2010/0054884 A1 | 3/2010 | Masuda et al. | |
| 2011/0170974 A1 | 7/2011 | Masuda | |
| 2015/0283625 A1 | 10/2015 | Sato et al. | |
| 2016/0207119 A1 | 7/2016 | Naruke | |
| 2016/0214184 A1* | 7/2016 | Krenzer | B23B 51/02 |
| 2017/0232529 A1 | 8/2017 | Kawakami et al. | |
| 2018/0043441 A1* | 2/2018 | Fujiwara | B23B 51/06 |
| 2018/0071836 A1 | 3/2018 | Fukushima | |
| 2018/0236568 A1 | 8/2018 | Yamamoto | |

FOREIGN PATENT DOCUMENTS

| | | |
|---|---|---|
| FR | 2747950 A1 | 10/1997 |
| JP | H02-063912 U | 5/1990 |
| JP | H06-032250 Y2 | 8/1994 |
| JP | H10-058291 A | 3/1998 |
| JP | 2006-281407 A | 10/2006 |
| JP | 2016-059999 A | 4/2016 |
| JP | 5940205 B1 | 6/2016 |
| JP | 6132377 B1 | 5/2017 |
| KR | 10-2009-0048437 A | 5/2009 |
| WO | 2008/001412 A1 | 1/2008 |
| WO | 2016152213 A1 | 9/2016 |
| WO | 2017/034038 A1 | 3/2017 |

OTHER PUBLICATIONS

Office Action of corresponding Japanese application No. 2018-511176, which is based on the International Application No. PCT/JP2017/032266, dated Apr. 2, 2019 and English translation thereof.
International Preliminary Report on Patentability including English translation of Written Opinion of the International Search Authority for PCT/JP2017/032266 dated Mar. 10, 2020.
The extended European search report of the corresponding EP application No. 17924021 dated Mar. 10, 2021.
The First Office Action of the corresponding CN patent application No. 201780094689.0 dated Sep. 2, 2020.
The office action of the corresponding KR application No. 10-2020-7010025 dated Jun. 15, 2021.

* cited by examiner

FIG. 14

| OUTER DIAMETER D OF DRILL | GASH FURROW | | | | | | |
|---|---|---|---|---|---|---|---|
| | 0.015D | 0.02D | 0.025D | 0.03D | 0.035D | 0.04D | 0.045D |
| φ5 | UNABLE TO FORM CIRCULAR ARC GROOVES | | 340 HOLES | 340 HOLES | | 340 HOLES | INTERFERE WITH LUBRICATION HOLES |
| φ6 | | 340 HOLES | | 340 HOLES | 340 HOLES | 340 HOLES | |
| φ8 | | | 340 HOLES | 340 HOLES | | 340 HOLES | |
| φ9 | | 340 HOLES | 340 HOLES | 340 HOLES | | 340 HOLES | |
| φ10 | | | | 340 HOLES | BREAKAGE (224 HOLES) | | |
| φ12 | | 340 HOLES | | 340 HOLES | BREAKAGE | | | ent
DRILL

TECHNICAL FIELD

The present invention relates to a drill.

BACKGROUND ART

In related art, a drill is known in which, as well as forming a thinning edge on an inside end side of a cutting edge by performing thinning processing on a leading end portion of a drill main body, a gash (referred to as an "R gash") is also formed, and a ridge with regard to a flank extends in a circular arc shape from the inner end side of the thinning edge toward an outer peripheral surface of the drill. The drill with this type of R gash improves bite of the thinning edge with a work material in the vicinity of a chisel, and chips are promptly discharged to a discharge groove of the drill as a result of the R gash, and can reduce a cutting resistance of the drill.

There is a drill in which the end portion on the outer peripheral side of the R gash is connected to the discharge groove further to the inside than the outer peripheral surface of the drill, so that the chips do not flow to the outer peripheral side of the drill (refer to Patent Literature 1, for example). In the drill in which the end portion of the R gash does not extend as far as the outer peripheral surface, a radius of curvature of a circular arc section is smaller than a drill in which the end portion of the R gash extends as far as the outer peripheral surface, and the chips are more likely to curl since the chips do not flow to the outer peripheral side. Further, an inner face of the R gash (a gash face) and the outer peripheral surface of the drill are positioned so as to be separated from each other, and thus, the chips are more easily cut, a discharge performance is improved, the cutting resistance of the drill is reduced, and it is possible to obtain a stable cutting resistance.

CITATION LIST

Patent Literature

Patent Literature 1: Japanese Laid-Open Patent Publication No. 2016-59999

SUMMARY OF INVENTION

Problems that Invention is to Solve

However, a thinning root portion that connects a rake face (a thinning face) of the thinning edge and the gash face extends from the vicinity of the chisel toward the discharge groove and has a cross-sectional V shape. When chips get caught up in this thinning root portion, there is a possibility that the chip discharge performance may deteriorate.

It is an object of the present invention to provide a drill that can improve a discharge performance of chips generated in the vicinity of a chisel, and reduce cutting resistance.

According to an aspect of the present invention, a drill includes: a drill main body configured to be rotated around a shaft center; a plurality of discharge grooves provided in a helical shape in an outer peripheral surface, from a leading end portion toward a base end portion of the drill main body; a cutting edge formed on a ridge section between an inner face of the discharge groove that is oriented toward a rotation direction side of the drill main body, and a flank of the drill main body at the leading end portion; a thinning edge provided at the leading end portion of the drill main body and extending from an inner end of the cutting edge toward a chisel portion that is a leading end section of the drill main body; and a gash portion, a ridge with respect to the flank extending in a circular arc shape from an inner end of the thinning edge, connecting to the discharge groove further to an inner peripheral side than the outer peripheral surface of the drill main body, wherein the gash portion includes a circular arc groove that have a circular arc shaped in a cross section, and that is provided in a section that connects a gash face of the gash portion and a thinning face which is a rake face and which connects the thinning edge and the discharge groove.

The chips generated when the thinning edge that extends in the vicinity of the chisel portion bites into a work material are scooped up by the thinning face, are curled by the gash face, and are discharged from the gash portion to the discharge groove without flowing to the outer peripheral surface side of the drill main body. The circular arc groove is provided between the thinning face and the gash face, and has the cross-sectional circular arc shape, and thus, the chips are not likely to become caught. As a result, the drill can smoothly discharge the chips from the gash portion to the discharge groove, and can reduce a cutting resistance, and a stable chip shape can be obtained.

In the present aspect, a radius of curvature of the circular arc groove may be at least 0.01D and no more than 0.03D. When the radius of curvature of the cross section of the circular arc groove is less than 0.01D, the chips are more likely to become caught in the circular arc groove, and there is a concern that the discharge performance of the chips from the gash portion to the discharge groove may deteriorate. When the radius of curvature of the cross section of the circular arc groove is greater than 0.03D, in order to configure the cross section shape of the circular arc groove that smoothly connects the thinning face and the gash face, the circular arc groove at a chip pocket formed by the thinning face, the gash face, and the circular arc groove is formed in a shallower position. In this case, if a standard is applied to the chisel (diameter, width) remaining in the center of the drill, a thickness of the thinning edge becomes thin, and a possibility of unexpected breakage due to stress concentration becomes higher.

In the present aspect, in a double-edged drill that is provided with two sets of the cutting edges, when the drill main body is seen from the leading end, a gash furrow that indicates a distance, in a first direction, between a tangential line of one of the gash portions and a tangential line of an other of the gash portions, which follow a second direction orthogonal to the first direction along with a tangential line at the inner end of the thinning edge, may be at least 0.02D and no more than 0.04D. In order to form the circular arc groove, it is necessary for the gash furrow to be 0.02d or more. Further, the larger the gash furrow, the more easily the capacity of the chip pocket can be increased, but when the gash furrow is larger than 0.04d, due to concern about the gash portion interfering with a lubrication hole formed in the drill main body, a wall thickness in the vicinity of a center becomes thin, and unexpected damage or breakage is more likely to occur.

In the present aspect, in a triple-edged drill that is provided with three sets of the cutting edges, when the drill main body is seen from the leading end, a web thickness of the thinning edge that indicates a distance between a first tangential line of an inner edge of a target thinning edge that is one of three of the thinning edges and a second tangential line which follows an direction of the first tangential line of a target gash portion positioned closest to the target thinning edge, among the gash portions facing the other thinning edges different from the target thinning edge may be at least 0.09 mm and no more than 0.3 mm. The smaller the thickness of the thinning edge, the more the rigidity of the chisel portion decreases, and there is a concern about breakage. Thus, the thickness of the thinning edge is preferably 0.09 mm or more. Note that, in terms of forming the gash portion and the circular arc groove having a shape of the present application, it is difficult for the thickness of the thinning edge to be formed to be greater than 0.3 mm.

BRIEF DESCRIPTION OF THE DRAWINGS

FIG. 14 is a table showing durability performances resulting from differences in combinations of an outer diameter D of a drill and a gash furrow E when machining deep holes.

MODES FOR CARRYING OUT THE INVENTION

Figure 1:
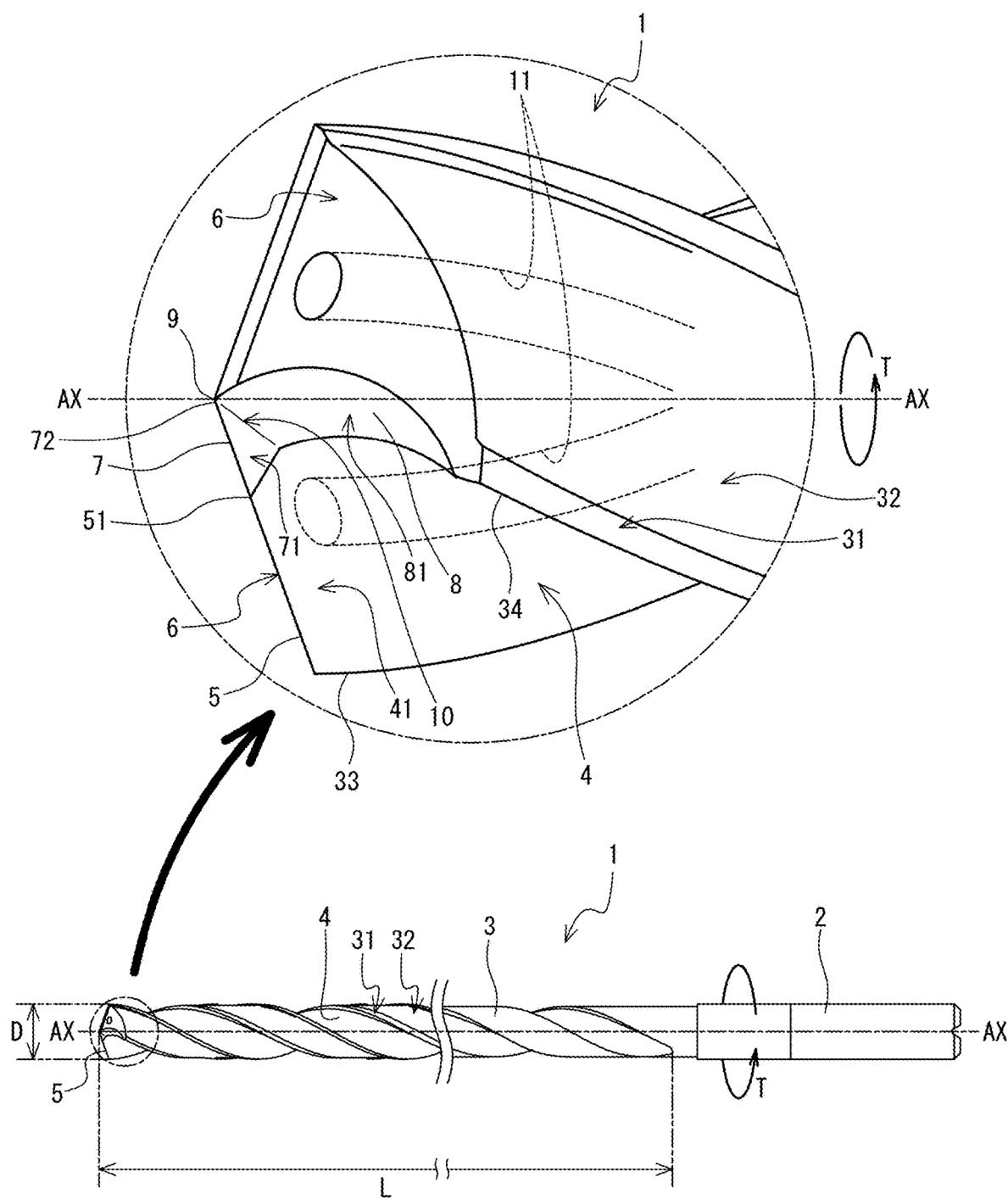
FIG. 1 is a side view of a drill 1.

Hereinafter, a drill 1 according to a first embodiment of the present invention will be explained with reference to the drawings. As shown in FIG. 1, the drill 1 of the first embodiment is a twist drill formed of a hard material, such as a hard sintered alloy, high speed tool steel (high speed steel), or the like. The drill 1 is provided with a shank 2, and a body 3 that extends from the shank 2 along a shaft center AX. The shank 2 is a section that holds the drill 1 in a main shaft of a machine tool, and the shank 2 side with respect to the body 3 is a rear end side of the drill 1. Two discharge grooves 4 for discharging chips are formed in a helical shape on an outer peripheral surface 31 of the body 3. The discharge grooves 4 open at a leading end portion of the body 3, and two cutting edges 5 are formed on opening sections of the discharge grooves 4. The drill 1 has a length such that a groove length L is equal to or greater than 10 times an outer diameter D (equal to or greater than 10D), and is also applied to a so-called long drill that has a length equal to or greater than 30D, for example. The drill 1 cuts a work material, using the cutting edges 5, by rotating around the shaft center AX, and forms a machining hole while discharging chips through the discharge grooves 4. At a time of machining, a rotation direction T of the drill 1 is a counterclockwise direction as seen in a front view. Specifically, the machine tool with the drill 1 is held on the main shaft cuts the work material by rotating the main shaft to the right.

Figure 2:
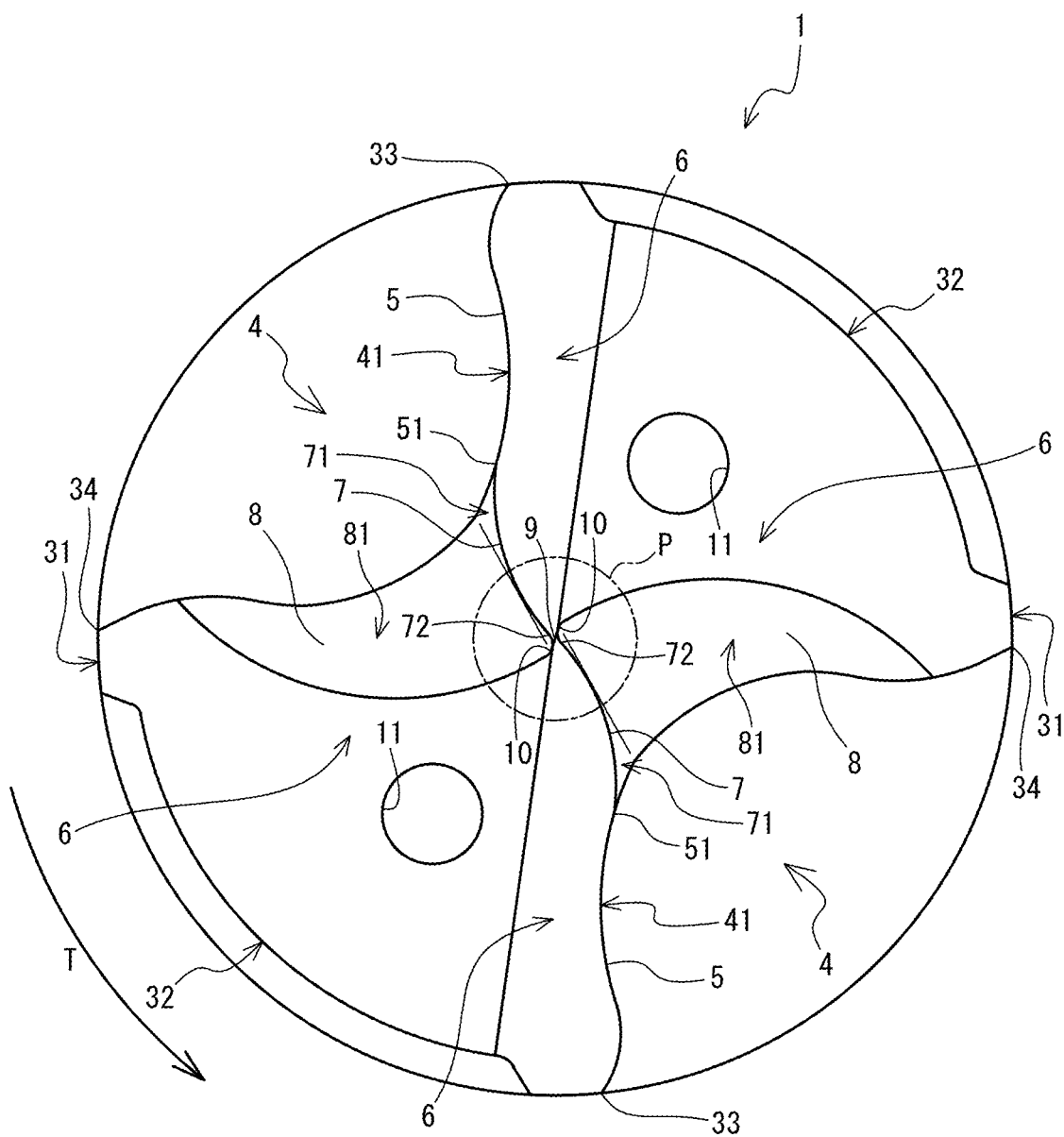
FIG. 2 is a front view of a leading end portion of the drill 1.

As shown in FIG. 1 and FIG. 2, the cutting edges 5 are formed on ridge sections between inner faces 41 of the discharge grooves 4 that are oriented toward the rotation direction T side, and flanks 6 of the leading end portion of the drill 1. The cutting edges 5 form a substantially S shape in a front view. Of each of the inner faces 41 of the discharge grooves 4, the inner face 41 in the vicinity of the cutting edge 5 is a so-called rake face, and causes the chips to flow to the discharge groove 4 by scoopedup the chips cut by the cutting edge 5. Of the inner face 41 of the discharge groove 4, a section at which the inner face 41 on the side of the cutting edge 5 intersects with the outer peripheral surface of the body 3 is a leading edge 33. A section at which the inner face 41 on the opposite side to the cutting edge 5 intersects with the outer peripheral surface 31 is a heel 34. Body clearances 32 of a smaller diameter than the outer diameter D of the drill 1 are formed on the outer peripheral surface 31 over intermediate sections between the leading edges 33 and the heels 34. By providing the body clearances 32, the drill 1 reduces wear resistance caused by contact between an inner surface of the machining hole and the outer peripheral surface 31 of the body 3 at the time of forming the machining hole, and heat generation and machining torque can be suppressed.

The drill 1 has two lubrication holes 11 that extend in a helical shape inside the body 3 along the discharge grooves 4. The two lubrication holes 11 penetrate through the inside of the drill 1 from the rear end of the shank 2 to the leading end of the drill 1, and open, respectively, at the flanks 6. At the time of machining, a cutting oil supplied inside the lubrication holes 11 reduces the cutting resistance, and suppresses the heat generation and the machining torque. Further, the chips flow into the discharge grooves 4 along with the cutting oil and are smoothly discharged.

Thinning processing is performed on the leading end portion of the drill 1, in order to thin a web thickness in the vicinity of a chisel 9. The thinning processing is processing to form each of thinning edges 7 by shaving, while rotating a grinding stone, for example, an opening section of the discharge groove 4 from an inner end 51, which is an end portion on the inside of the shaft center AX side of the cutting edge 5, to the side of the chisel 9. The thinning edges 7 are formed while causing the grinding stone and the drill 1 to move relatively to each other, and each extends in a circular arc shape in a front view from the inner end 51 of the cutting edge 5 toward the chisel 9. As a result of forming the thinning edges 7, thinning faces 71 are formed on the leading end portion of the drill 1, which are rake faces oriented toward the rotation direction T side of the thinning edges 7.

In the thinning processing, after each of the thinning edges 7 is formed, the grinding stone performs further shaving by being caused to move relatively to the drill 1 toward the heel 34 side, and a gash portion 8 that is connected to each of the discharge grooves 4 is formed. A ridge at which a gash face 81 that is an inner face of the gash portion 8 intersects the flank 6 of the leading end portion of the drill 1, extends in a circular arc shape from an inner end 72 that is an end portion on the inside of the shaft center AX of the thinning edge 7, and is connected to the discharge groove 4 further to an inner side than the outer peripheral surface 31 in a radial direction. In other words, the gash face 81 is formed as a curved surface that is recessed inward. Thus, the gash portions 8 can secure a larger capacity of chip pockets that store the chips cut by the thinning edges 7, and can feed the chips smoothly to the discharge grooves 4 without clogging.

At the time of machining, the chips that are generated by each of the thinning edges 7 that extend in the vicinity of the chisel 9 biting into the work material are scooped up by the thinning faces 71 and pushed out to the gash portions 8. The chips are caused to curl by the gash faces 81 that form the curved surfaces, are cut by the leading edges 33, and are fed out to the discharge grooves 4. At this time, if the chips enter a space between the outer peripheral surface 31 of the drill 1 and the inner surface of the machining hole, the chips are not cut by the leading edges 33 and sometimes become too long. In the drill 1 of the first embodiment, since the end portion on the outer peripheral side of each of the gash portions 8 does not reach the outer peripheral surface 31 of the drill 1, the chips do not easily flow to the outer peripheral surface 31 side, and do not easily reach the space between the outer peripheral surface 31 and the inner surface of the machining hole. By cutting the chips to be relatively small and causing the chips to form small curls, the frill 1 can discharge the chips smoothly from the discharge grooves 4 and reduce the cutting resistance.

Figure 3:
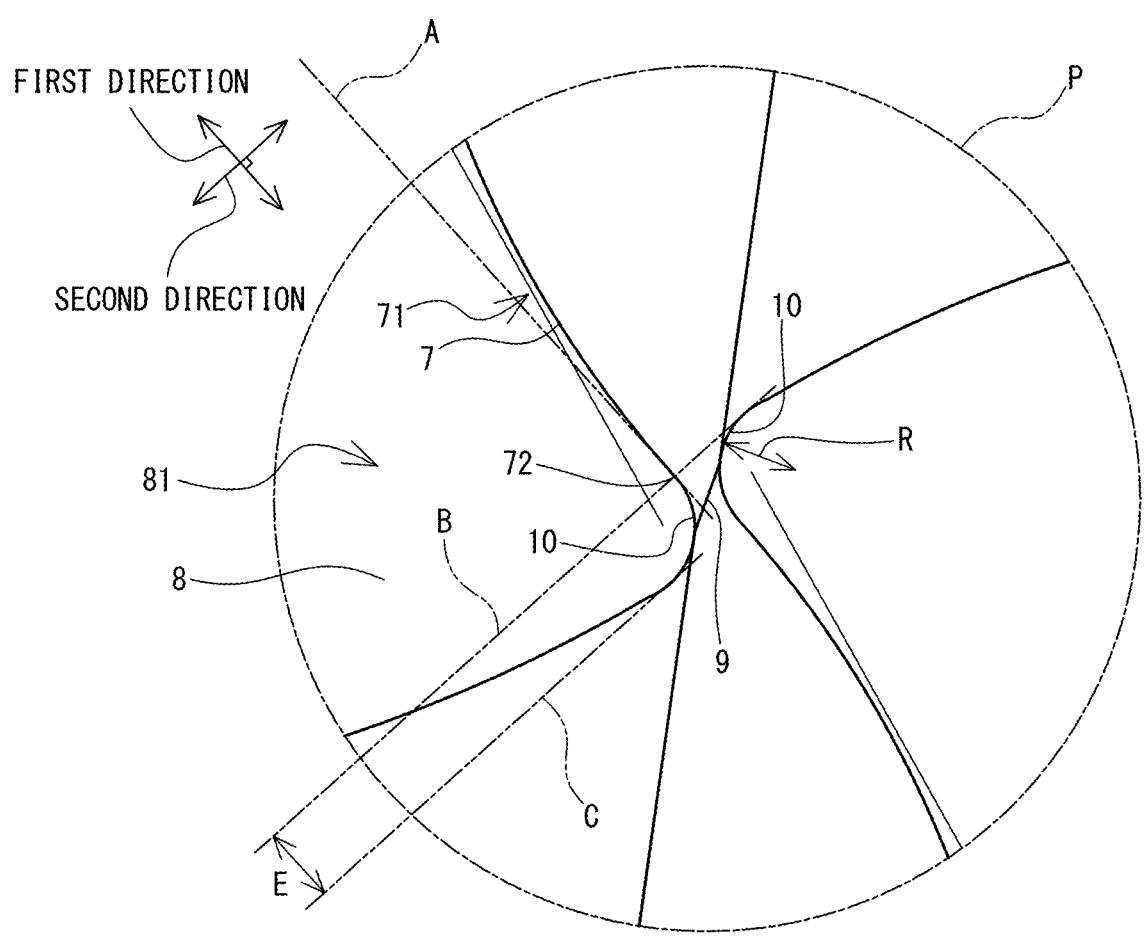
FIG. 3 is a front view of the leading end portion of the drill 1 and is an enlargement of the inside of a circle P in FIG. 2.

Circular arc grooves 10 are formed in sections that connect each of the gash faces 81 and the thinning faces 71. Each of the circular arc grooves 10 extends in a straight line from the vicinity of the chisel 9 toward the discharge groove 4 and a cross section in an extending direction thereof forms a circular arc shape. The circular arc grooves 10 cause the chips cut by the thinning edges 7 and scooped up by the thinning faces 71 to flow smoothly to the discharge grooves 4. By being provided with the circular arc grooves 10 between the gash faces 81 and the thinning faces 71, and the drill 1 can smoothly push the chips out from the thinning faces 71 to the gash portions 8. Thus, the drill 1 can reduce the cutting resistance and can also obtain a stable chip shape. As shown in FIG. 3, in the first embodiment, each of the circular arc grooves 10 is formed such that a radius of curvature R of the cross section thereof is within a range between 0.01D to 0.03D. When the radius of curvature R is less than 0.01D, the chips are more likely to become caught when being pushed out from the thinning faces 71 to the gash portions 8, and there is a concern that the discharge performance of the chips from the gash portions 8 to the discharge grooves 4 may deteriorate. On the other hand, when the radius of curvature R is greater than 0.03D, with respect to the chip pockets formed by the circular arc grooves 10, the thinning faces 71, and the gash faces 81, in order to configure the cross section shape of the circular arc groove 10 that smoothly connects each of the thinning faces 71 and the gash faces 81, it is necessary to form the circular arc grooves 10 in a shallower position. In this case, when the diameter and the width of the chisel 9 are formed in accordance with a standard specification, the thickness of the thinning edges 7 becomes thinner, and there is a concern that unexpected breakage may occur due to stress concentration.

When the leading end portion of the drill 1 is seen from the front, a direction in which a tangential line A of the inner end 72 of the thinning edge 7 extends is a first direction, and a direction orthogonal to the first direction is a second direction. A distance in the first direction between a tangential line B and a tangential line C that both extend in the second direction and respectively come into contact with the ridges between the two gash portions 8 and flanks 6 is a gash furrow E. In the first embodiment, each of the gash portions 8 is formed such that the gash furrow E is within a range between 0.02D to 0.04D. If the gash furrow E is made larger, the capacity of the chip pocket can be made larger, but the web thickness in the vicinity of the chisel 9 becomes thin. When the gash furrow E is greater than 0.04D, there is a possibility that the gash portion 8 may interfere with the lubrication hole 11, and further, there is a concern that the thinner web thickness in the vicinity of the chisel 9 may give rise to unexpected damage or breakage. When the gash furrow E is made smaller, the web thickness in the vicinity of the chisel 9 becomes thicker, and rigidity can be secured, but in order to make the gash furrow E smaller, it is necessary to cause the inner end of the gash portion 8 to be closer to the inner end 72 of the thinning edge 7. When the gash furrow E is less than 0.02D, the inner end of the gash portion 8 is close to the inner end 72 of the thinning edge 7, and there is a possibility that the circular arc groove 10 cannot be formed.

Next, a drill 101 of a second embodiment will be explained. The drill 101 of the second embodiment has basically the same configuration as the drill 1 of the first embodiment excepting that a number of edges is different, and hereinafter, the explanation of the drill 101 will be simplified.

Figure 4:
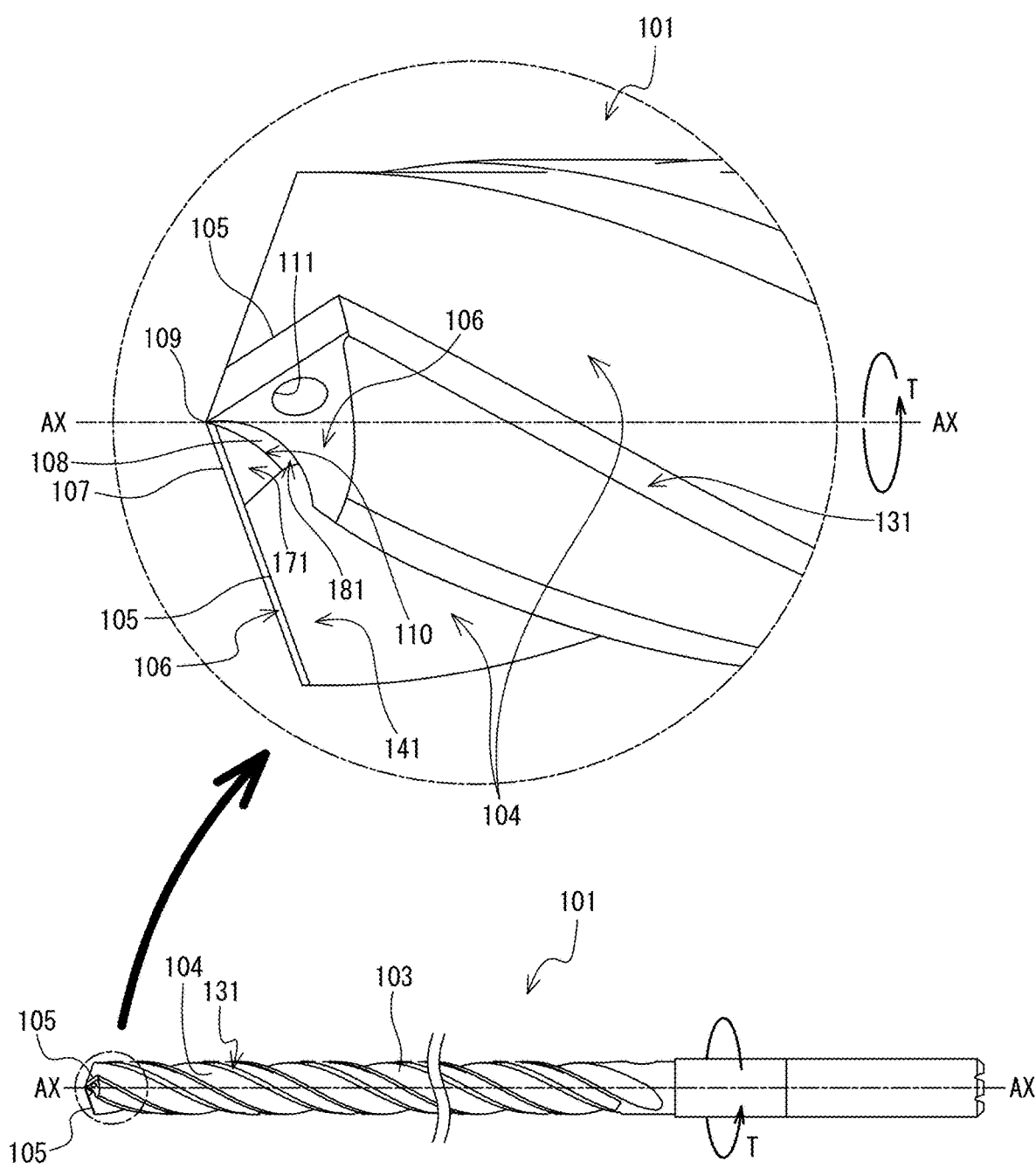
FIG. 4 is a side view of a drill 101.
Figure 5:
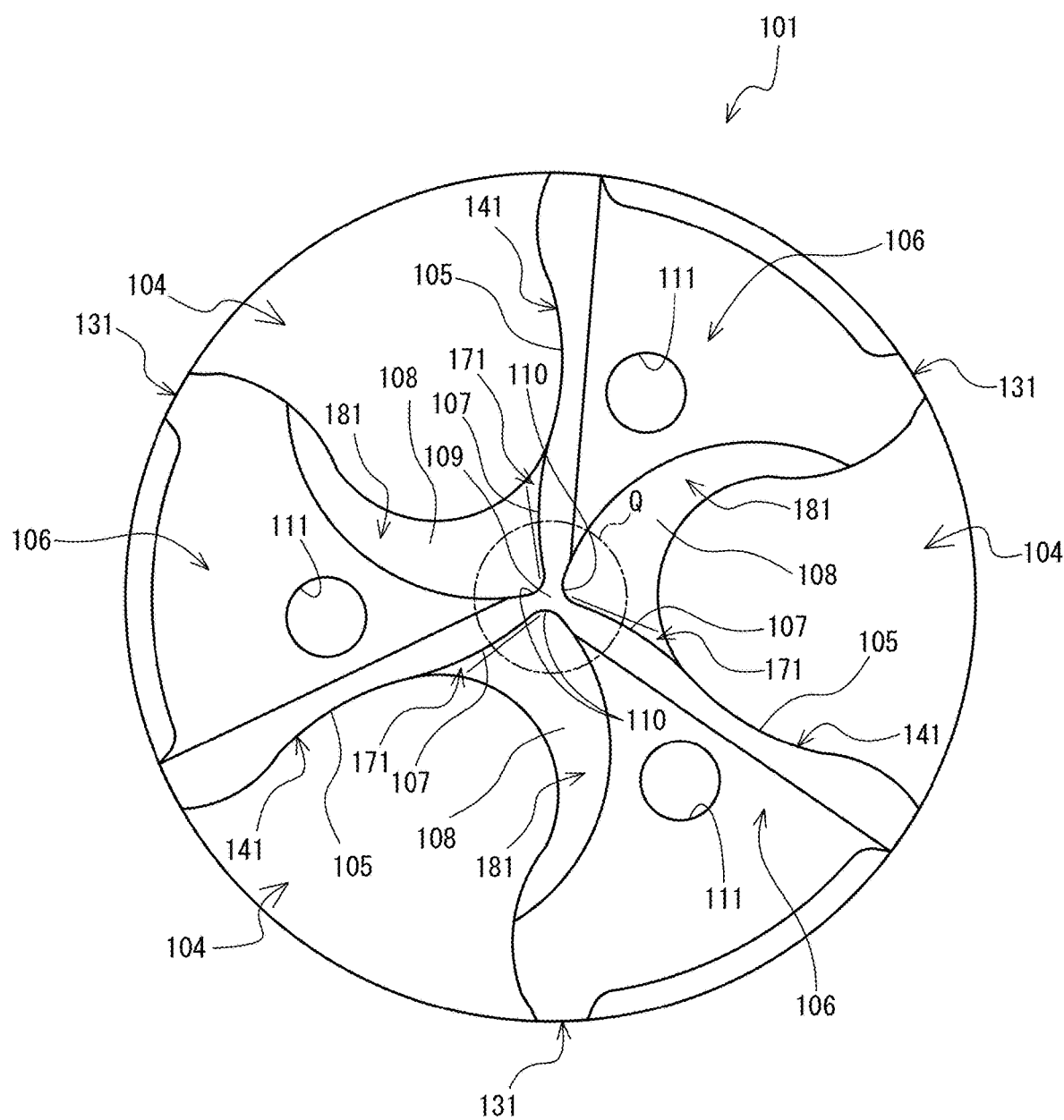
FIG. 5 is a front view of a leading end portion of the drill 101.

As shown in FIG. 4 and FIG. 5, the drill 101 is a drill in which three discharge grooves 104 are formed in a helical shape in an outer peripheral surface 131 of a body 103. Three cutting edges 105 are formed on opening sections of the discharge grooves 104 at the leading end portion of the body 103. The cutting edges 105 are formed on ridge sections between inner faces 141 of the discharge grooves 104 that are oriented toward the rotation direction T side, and flanks 106 of the leading end portion of the drill 101. Three lubrication holes 111 that extend in a helical shape inside the body 103 along the discharge grooves 104 open, respectively, at the flanks 106. Thinning processing is performed on the leading end portion of the drill 101, and thinning edges 107 are formed. Further, of gash portions 108 that are formed by the thinning processing, ridges between each of gash faces 181 and the flanks 106 extend in a circular arc shape from a chisel 109 side, and are connected to the discharge grooves 104 further to the inner side than the outer peripheral surface 131 in the radial direction. An effect of connecting the ridges between the gash faces 181 and the flanks 106 to the discharge grooves 104 at a position further to the inner side than the outer peripheral surface 131 is the same as that of the first embodiment.

Figure 6:
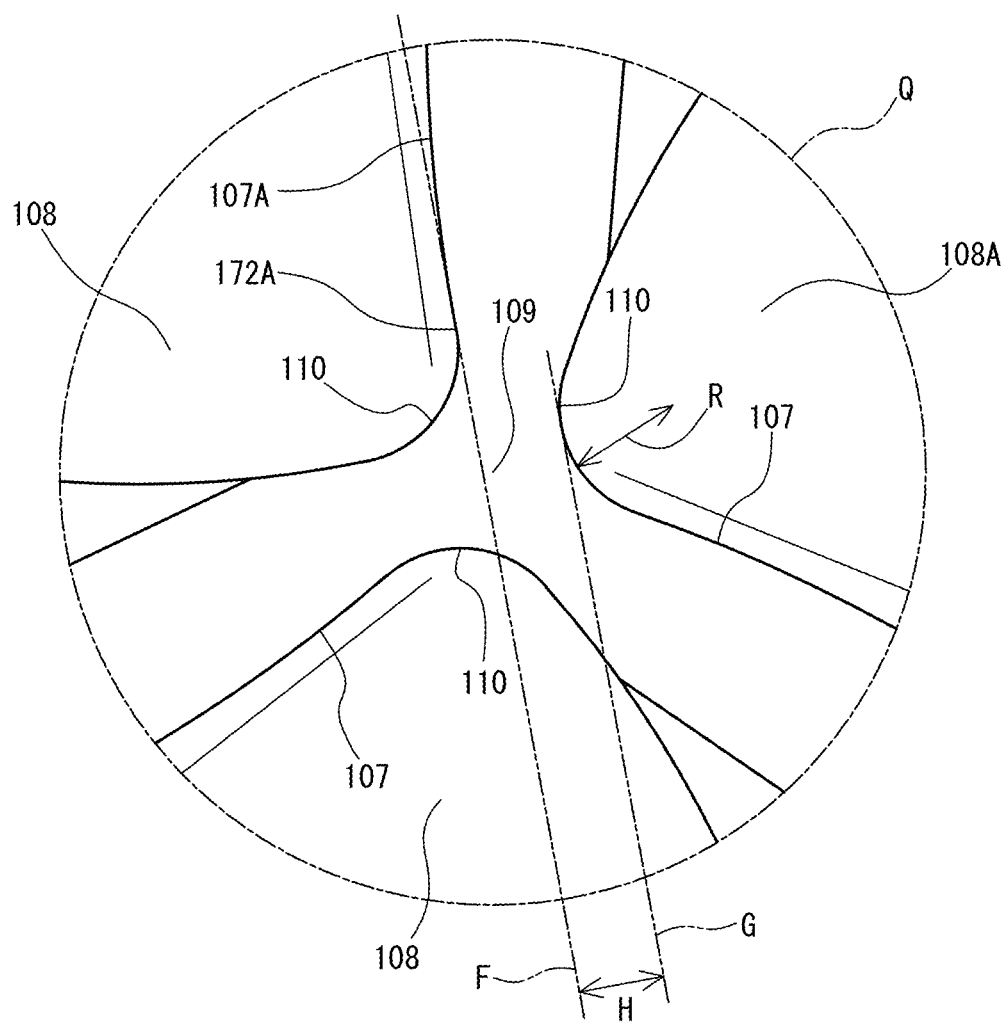
FIG. 6 is a front view of the leading end portion of the drill 101 and is an enlargement of the inside of a circle Q in FIG. 5.

Circular arc grooves 110 are formed in sections that connect the gash faces 181 and thinning faces 171. A cross section of each of the circular arc grooves 110 is a circular arc shape and each extends in a straight line from the vicinity of the chisel 109 toward the discharge groove 104. As shown in FIG. 6, each of the circular arc grooves 110 is formed such that the radius of curvature R of the cross section thereof is within the range from 0.01D or greater to 0.03D or less. The effects of providing the circular arc grooves 110, and the effects of forming the radius of curvature R of the cross section of each of the circular arc grooves 110 to be within the above-described range are the same as those of the first embodiment.

When the leading end portion of the drill 101 is seen from the front, attention will be paid to one of the three thinning edges 107, and will be referred to as a target thinning edge 107A. A tangential line with respect to an inner end 172A of the target thinning edge 107A will be referred to as a first tangential line F. Further, of the gash portions 108 that face the other thinning edges 107 different to the target thinning edge 107A, the gash portion 108 positioned closest to the target thinning edge 107A is referred to as a target gash portion 108A. A tangential line of the target gash portion 108A that is parallel to the first tangential line F will be referred to as a second tangential line G. A distance between the first tangential line F and the second tangential line G will be referred to as a thinning edge thickness H. In the second embodiment, the thinning edge thickness H is formed to be 0.09 mm or greater. Since the smaller the thinning edge thickness H, the lower the rigidity of the chisel 109, and there is the concern of breakage, the thinning edge thickness H is preferably 0.09 mm or greater. Note that, in order to provide the circular arc grooves 110 with the above-described configuration, it is difficult to secure the thinning edge thickness H to be 0.3 mm or greater.

Note that the present invention is not necessarily limited to each of the above-described embodiments, and various modifications are possible. The drills 1 and 101 provided with the gash portions 8 and 108 having the shape of the present specification may be applied to a cutting tool, such as an end mill, a tap, or the like. The thinning edges 7 and 107 are formed using the grinding stone in the thinning processing, and the gash portions 8 and 108 are formed while forming the circular arc grooves 10 and 110 in the same process, but the grinding may be performed while being divided into a plurality of processes, and each of the portions may be formed in the respective processes. The drills 1 and 101 may be a drill for which the rotation direction T at the time of machining is a clockwise direction in a front view. Further, each of the drills 1 and 101 is a so-called double margin drill in which the body clearances 32 are provided between each of the leading edges 33 and the heels 34, and drilling accuracy is improved, but each of the drills 1 and 101 may be a so-called single margin drill in which the body clearances 32 reach the heels 34. Alternatively, the body clearances 32 need not necessarily be provided.

In order to verify the effects of forming the circular arc shaped gash portions 8 and 108 connected to the discharge grooves 4 and 104 at the positions further to an inner peripheral side than the outer peripheral surfaces 31 and 131, and further, of providing the circular arc grooves 10 and 110 on the connecting sections between the thinning faces 71 and 171 and the gash faces 81 and 181, various evaluation tests were performed with respect to the drill 1 of the first embodiment and the drill 101 of the second embodiment described above.

Working Example 1

Figure 7:
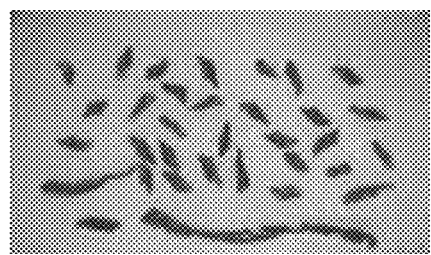
FIG. 7 is a photograph showing a size of chips resulting from a drill 1A in which gash portions reach an outer peripheral surface.
Figure 8:
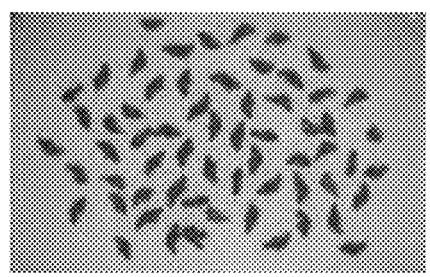
FIG. 8 is a photograph showing a size of chips resulting from a drill 1B in which the gash portions do not reach an outer peripheral surface.

To start, a first test was performed to verify the effects of forming the circular arc shaped gash portions (hereinafter referred to as "gash portions of a present application shape") that are connected to discharge grooves further to an inner peripheral side than an outer peripheral surface. In the first test, with an outer diameter D of Φ6, a double-edged drill 1A in which the radius of curvature of each of the circular arc shaped gash portions is 2.9 mm, and a double-edged drill 1B in which the radius of curvature of each of the circular arc shaped gash portions is 1.4 mm were prepared. The gash portions of the drill 1A reach the outer peripheral surface and the gash portions of the drill 1B have the present application shape. In the first test, using the drill 1A and the drill 1B, the chips generated by cutting the work material were sampled and compared. Note that the first test was performed under the following conditions:

Work material: Material equivalent to SCM440
Machining depth: 300 mm (50 times outer diameter D)
Cutting speed: 60 m/min
Feed amount: 0.3 mm/rev
Cutting oil: MQL As shown in FIG. 7, the chips generated by cutting the work material using the drill 1A are individually larger than the chips generated by cutting the work material using the drill 1B shown in FIG. 8. Since the radius of curvature of the circular arc shape of each of the gash portions is larger in the drill 1A than the drill 1B, a degree of curling of the chips is relatively large. Further, of the chips of the drill 1A, chips were sampled that were too long due to insufficient cutting. According to the results of the first test, it can be determined that, since the drill 1B was able to cut the chips of the work material relatively small and fine as a result of providing the gash portions of the present application shape, a chip discharge performance is more easily secured.

Working Example 2

Figure 9:
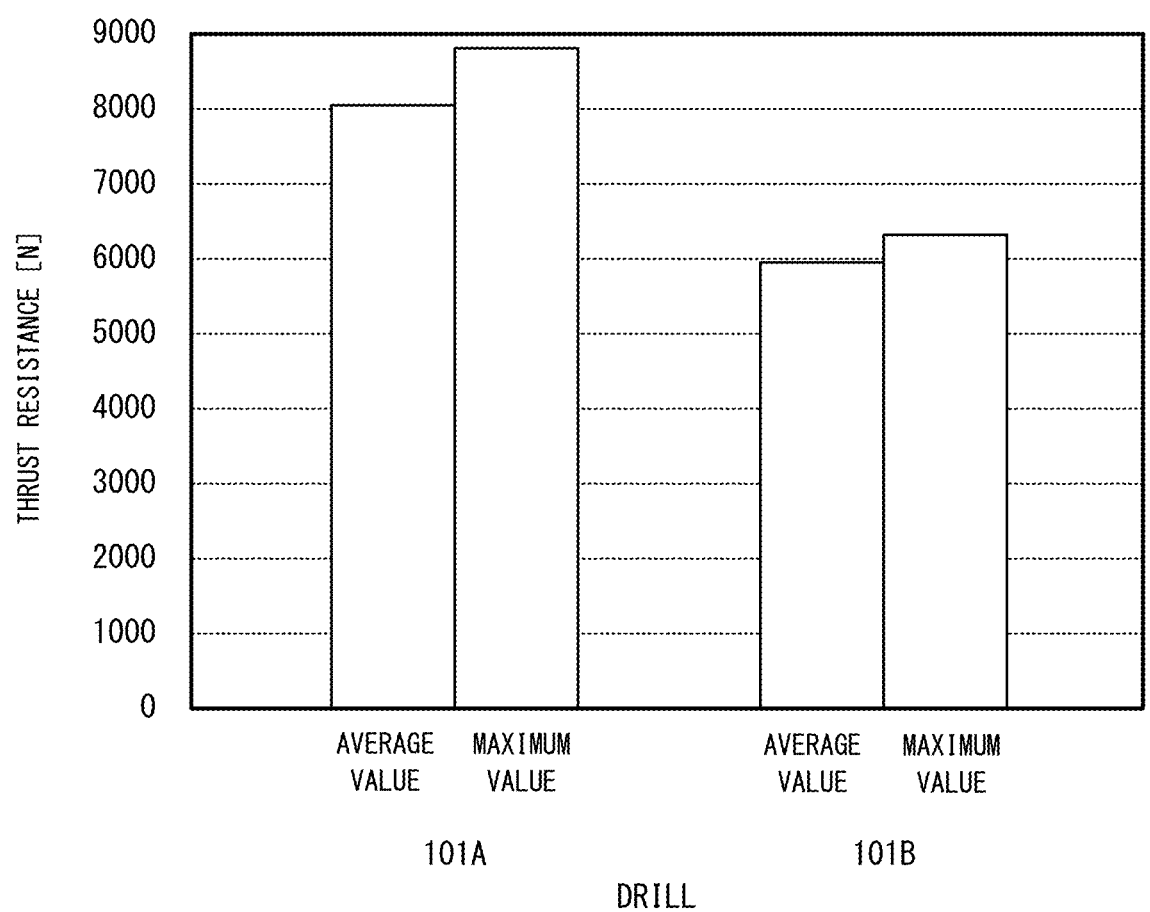
FIG. 9 is a graph in which thrust resistances resulting from differences in the shape of the gash portions when machining a through hole are compared.

Next, in order to specifically verify the effects of providing the gash portions of the present application shape, second to fifth tests were performed. First, in the second test, thrust resistances when machining a through hole were compared. As test samples, with the outer diameter D of Φ16, a plurality of triple-edged drills 101A of related art in which the gash portions reach the outer peripheral surface in a straight line shape, and of triple-edged drills 101B in which the gash portions of the present application shape each have the radius of curvature of 3.84 mm were prepared. In the second test, the thrust resistances were measured when forming the through holes in the work material using the drills 101A and 101B. Note that the second test was performed under the following conditions:

Work material: Carbon steel (S50C)
Machine used: Horizontal machining center
Machining depth: 16 mm through hole
Cutting speed 100 m/min
Feed amount 0.64 mm/rev As shown in FIG. 9, a maximum value of the thrust resistance when the through hole was formed using the drill 101A of the related art is 8812N, and the average thrust resistance also exceeds 8000N, at 8047N. In contrast to this, a maximum value of the thrust resistance when the through hole was formed using the drill 101B is 6335N, and the average thrust resistance is less than 6000N, at 5964N. According to the results of the second test, it was verified that the thrust resistance at the time of machining can be reduced by the drill 101B being provided with the gash portions of the present application shape.

Working Example 3

Figure 10:
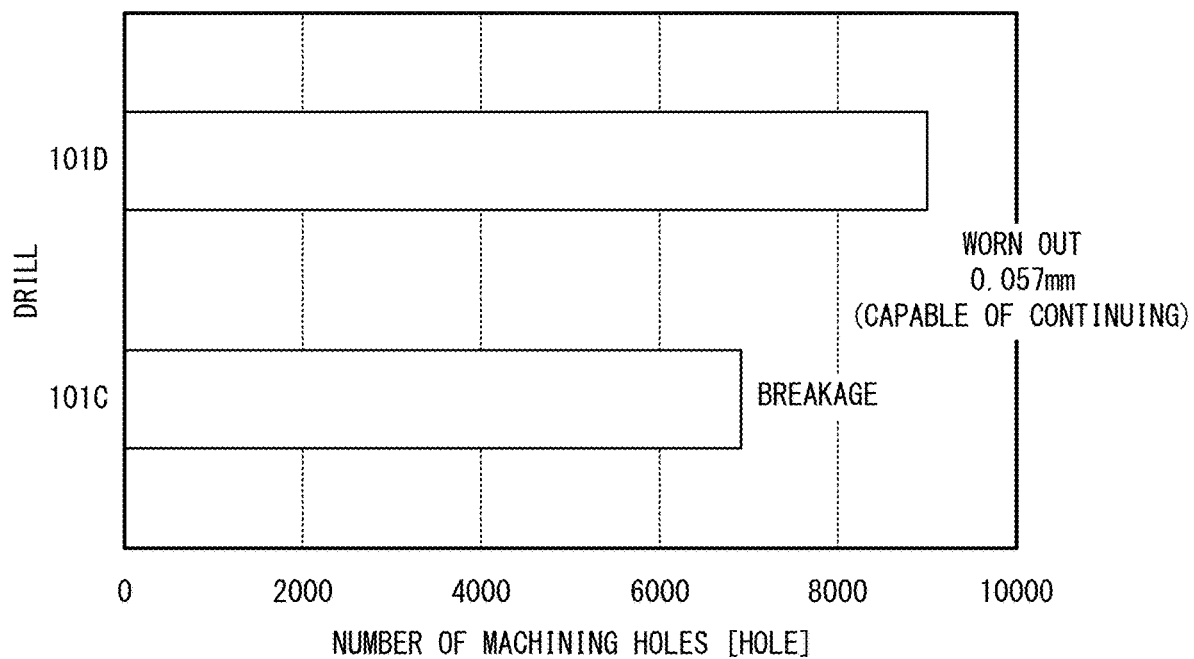
FIG. 10 is a graph in which durability performances resulting from differences in the shape of the gash portions when machining blind holes are compared.

Next, in the third test, durability performances were compared when machining a blind hole in which the chip discharge performance is important. As test samples, with the outer diameter D of Φ4, a plurality of triple-edged drills 101C of the related art in which the gash portions reach the outer peripheral surface in the straight line shape, and of triple-edged drills 101D in which the gash portions of the present application shape each have the radius of curvature of 0.6 mm were prepared. In the third test, the drills 101C and 101D continuously formed a plurality of machining holes in the work material, and the durability performances were compared by inspecting a state of the drills in the course of the machining. Note that the third test was performed under the following conditions:
    Work material: Carbon steel (S50C)
    Machine used: Horizontal machining center
    Machining depth: 12 mm blind hole
    Cutting speed 100 m/min
    Feed amount 0.16 mm/rev As shown in FIG. 10, the drill 101C of the related art broke after forming 6911 holes. In contrast to this, the drill 101D did not break, even after forming 9000 holes. Note also that, when the state of the drill 101D was checked after forming the 9000 holes, the cutting edges had worn by 0.057 mm, but were almost undamaged, and were in a state of being able to continue forming the machining holes. According to the results of the third test, it was verified that the drill 101D on which the load was reduced at the time of machining due to providing the gash portions of the present application shape was able to secure the durability, and was able to machine more of the blind holes than the drill 101C.

Working Example 4

Further, in the fourth test, thrust resistances when machining deep holes were compared. As test samples, with the outer diameter D of Φ8.4, a triple-edged drill 101E of the related art in which the gash portions reach the outer peripheral surface, and a triple-edged drill 101F in which the circular arc shape of the gash portions of the present application shape each have the radius of curvature of 1.8 mm were prepared. Further, for the purpose of comparison, a plurality of double-edged drills 1C in which the gash portions are connected to the outer peripheral surface 31 in the straight line shape were also prepared. In the fourth test, the thrust resistances were measured when machining a first hole and when machining a second hole when two holes were successively formed in the work material using the drills 101E, 101F and 1C. Note that the fourth test was performed under the following conditions:
    Work material: Carbon steel (Special material equivalent to S50C)
    Machine used: Horizontal machining center
    Machining depth: 40.7 mm
    Ejection: 71.74 mm (70 mm from shoulder)
    Cutting oil: Water-soluble cutting fluid (dilution ratio 20%)

Figure 11:
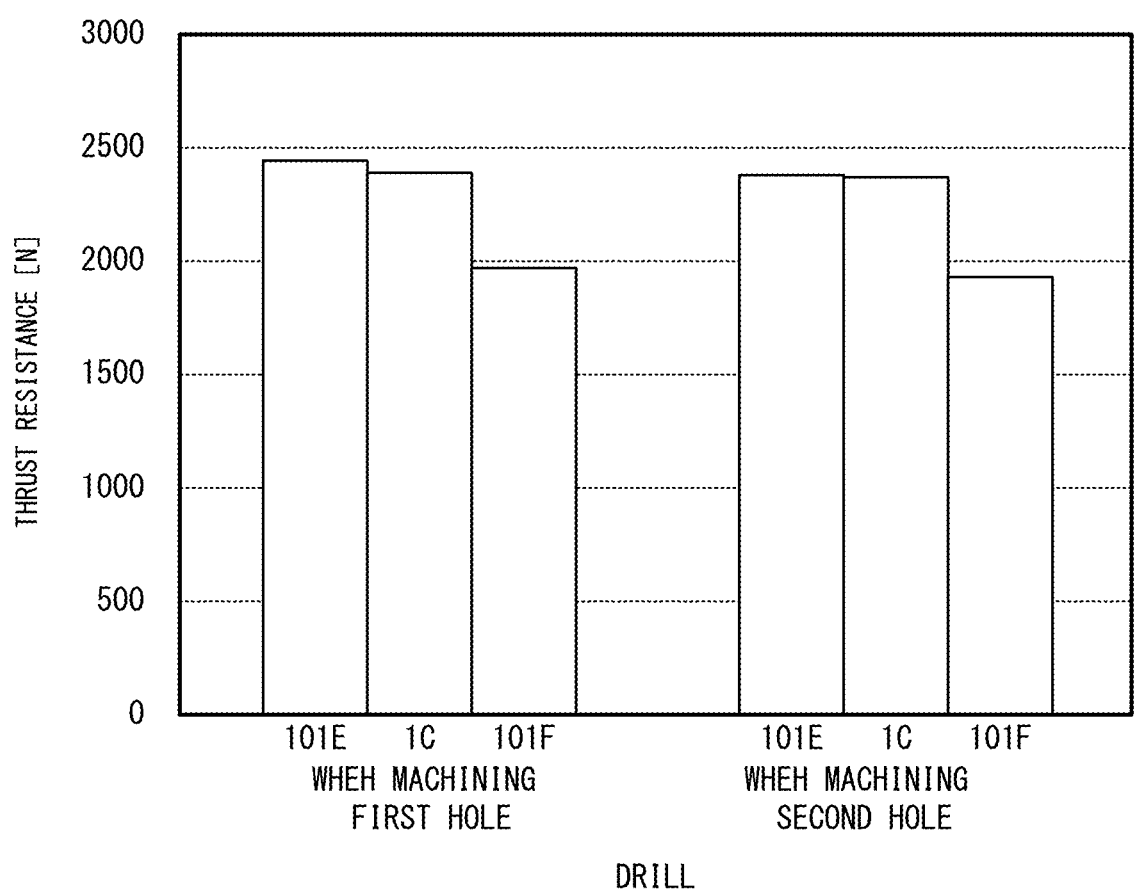
FIG. 11 is a graph in which thrust resistances resulting from differences in the shape of the gash portions when machining deep holes are compared.

As shown in FIG. 11, an average value of the thrust resistance when the first hole was formed using each of the drills was 2426N for the drill 101E (with a maximum value of 2905N), and 2391N for the drill 1C (with a maximum value of 2773N). In contrast to these, the average value of the thrust resistance was less than 2000N for the drill 101F, at 1968N (with a maximum value of 2205N). The average value of the thrust resistance for each of the drills when the second hole was formed was lower than for the first hole, and was 2380N for the drill 101E (with a maximum value of 3066N), 2369N for the drill 1C (with a maximum value of 2668N), and was 1930N for the drill 101F (with a maximum value of 2314N). According to the results of the fourth test, it was verified that the thrust resistance at the time of machining can be reduced, in comparison to the drills 101E and 1C of the related art, by the drill 101F being provided with the gash portions of the present application shape.

Working Example 5

Figure 12:
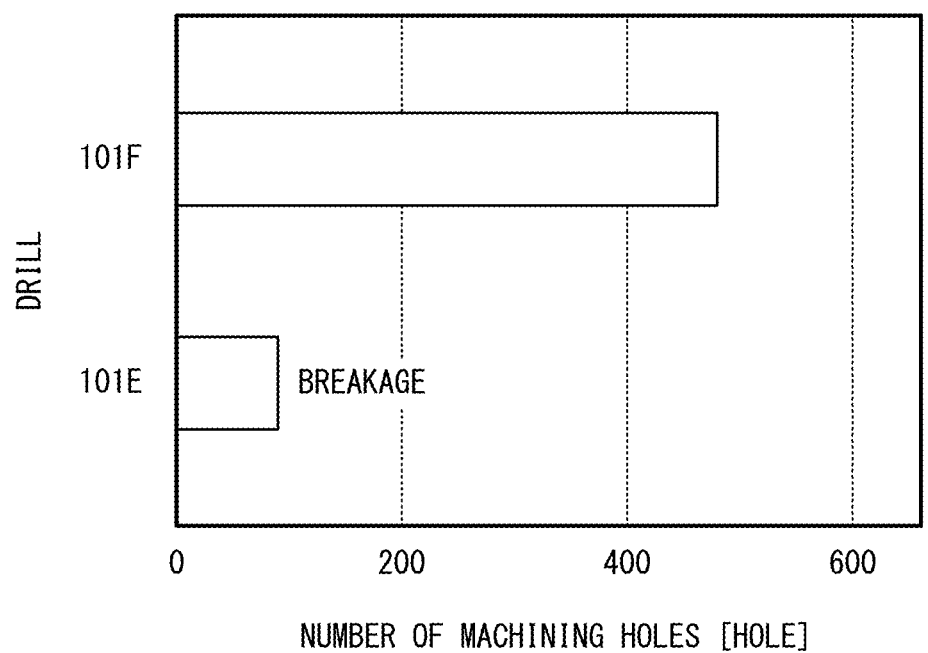
FIG. 12 is a graph comparison in which durability performances resulting from differences in the shape of the gash portions when machining deep holes are compared.

In the fifth test, the drills 101E and 101F used in the fourth test were used, and durability performances were compared when machining deep holes. The fifth test was performed under the conditions of the fourth test, and drilling processing in the work material was continuously performed by the drill 101E and the drill 101F. As shown in FIG. 12, the drill 101E of the related art broke after machining 89 holes. In contrast to this, the drill 101F was able to machine more than 450 holes. Note also that, although the drill 101F did not break, when the state of the drill 101F was checked after machining the 480 holes, the cutting edges were slightly worn, but were almost undamaged, and were in a state of being able to continue forming the machining holes. According to the results of the fifth test, it was verified that the drill 101F on which the load was reduced at the time of machining due to providing the gash portions of the present application shape was able to secure the durability, and was able to machine even more of the deep holes than the drill 101E.

Working Example 6

Figure 13:
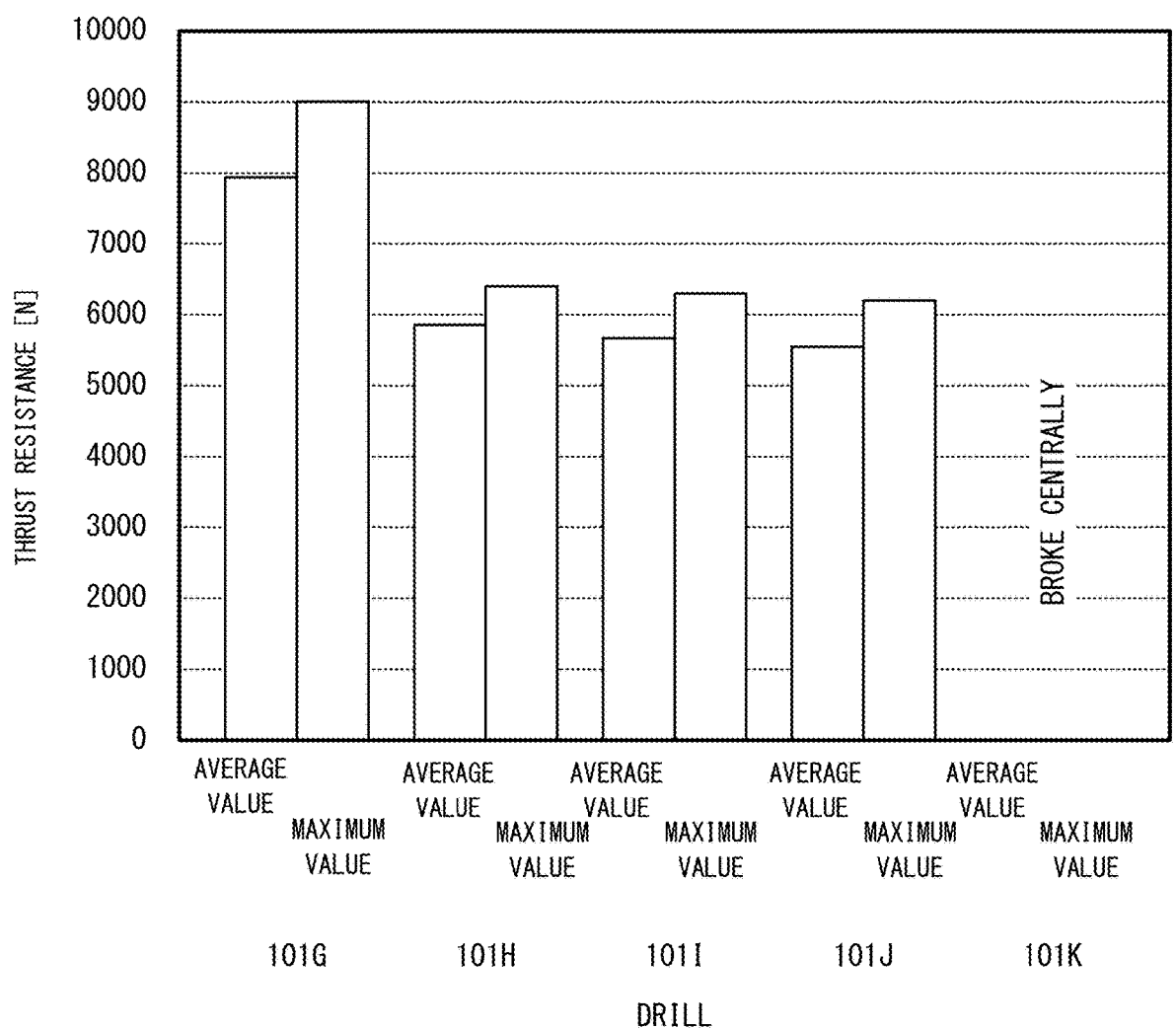
FIG. 13 is a graph in which thrust resistances resulting from the presence or absence of, and differences in the size of circular arc grooves when machining blind holes are compared.

Next, a sixth test was performed in order to verify the effects of forming the circular arc grooves 10 and 110. In the sixth test, thrust resistances when machining deep holes were compared. As test samples, with the outer diameter D of Φ16, a plurality of drills 101G having the gash portions of the present application shape and in which grooves each having a V shaped cross section are formed in sections connecting thinning faces and gash faces, and a plurality of drills 101H, 101I, 101J, and 101K having the gash portions of the present application shape and in which the circular arc grooves are formed, were prepared. Note that, in the drills 101H, 101I, 101J, and 101K, the radius of curvature R of the cross section of each of the circular arc grooves were formed to be 0.01D, 0.02D, 0.03D, and 0.04D, respectively. In the sixth test, the thrust resistances were measured when forming a blind hole in the work material using the drills 101G to 101K. Note that the sixth test was performed under the following conditions:
    Work material: Material equivalent to SCM44
    Machining depth: 32 mm
    Cutting speed: 90 m/min
    Feed amount: 0.64 mm/rev As shown in FIG. 13, when the blind hole was formed using the drill 101G having the gash portions of the present application shape and not having the circular arc grooves, the maximum value of the thrust resistance was 9007N, and the average value was 7944N. In contrast to this, when the blind hole was formed using the drill 101H in which the circular arc grooves having the radius of curvature R of 0.01D are formed, the maximum value of the thrust resistance was 6413N and the average value was 5863N. Further, when the blind hole was formed using the drill 101I in which the circular arc grooves having the radius of curvature R of 0.02D are formed, the maximum value of the thrust resistance was 6298N, and the average value was 5675N. When the blind hole was formed using the drill 101J in which the circular arc grooves having the radius of curvature R of 0.03D are formed, the maximum value of the thrust resistance was 6211N, and the average value was 5550N. However, when the blind hole was formed using the drill 101K in which the circular arc grooves having the radius of curvature R of 0.04D are formed, the drill 101K broke centrally. According to the results of the sixth test, the drills 101H to 101J in which the circular arc grooves having the radius of curvature R from 0.01D to 0.03D are provided in the gash portions, the chips did not easily become caught at the time of machining. In this way, it was verified that, since the drills 101H to 101J were able to improve the discharge performance of the chips from the gash portions to the discharge grooves, the drills 101H to 101J were able to reduce the thrust resistance at the time of machining, in comparison to the drill 101G not having the circular arc grooves. On the other hand, with the drill 101K in which the circular arc grooves having the radius of curvature R of 0.04D are formed in the gash portions, the circular arc grooves are formed in a shallow manner, resulting in the thinning edges becoming thin, and thus, unexpected breakage occurred due to stress concentration.

Working Example 7

Next, a seventh test was performed in order to verify the effects of setting a range of the size of the gash furrow E in the double-edged drill. In the seventh test, durability performances when forming deep holes were compared. As test samples, drills were prepared having the gash portions of the present application shape and the circular arc grooves, and the drills were manufactured with various combinations of the outer diameter D and the gash furrow E being in a range of Φ5 to Φ12, and 0.02D to 0.04D, respectively. Note that for the drill having the gash furrow E of less than 0.02D, the circular arc grooves could not be formed. Further, for the drill having the gash furrow E of more than 0.04D, there was interference between the gash portion and the lubrication hole. In the seventh test, machining to form deep holes in the work material using the drills of the above-described combinations was successively performed. Note that the seventh test was performed under the following conditions:
  Work material: Material equivalent to SCM440
  Machining depth: 300 mm
  Cutting speed 80 m/min
  Feed amount 0.35 mm/rev
  Radius of curvature R of circular arc grooves: 0.03D In the seventh test, it was determined that the drills able to successively form 340 holes were up to standard with regard to the durability performance. As shown in FIG. 14, it was verified that a sufficient durability performance could be secured as long as the drills were Φ9 or less and the gash furrow E was 0.04D or less. Further, even with the drills of Φ10 or more, the sufficient durability performance could be secured as long as the gash furrow E was 0.03D or less.

Working Example 8

Next, an eighth test was performed in order to verify the effects of setting a range of the size of the thinning edge thickness H in the triple-edged drill.

In the eighth test, durability performances when forming deep holes were compared. As test samples, with the outer diameter D of Φ10, drills 101L, 101M, 101N, and 101U were prepared having the gash portions of the present application shape and the circular arc grooves, and having the thinning edge thickness H of 0.05 mm, 0.07 mm, 0.09 mm, and 0.14 mm, respectively.

In the eighth test, machining to form deep holes in the work material using the drills 101L, 101M, 101N, and 101U was successively performed.

Figure 15:
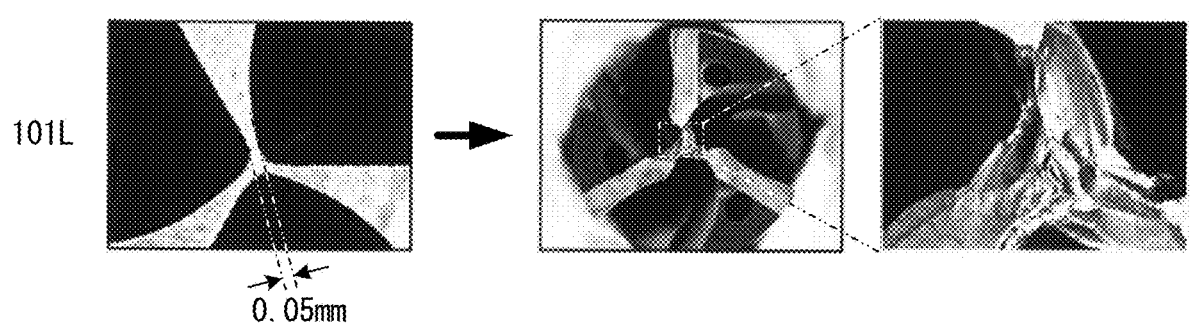
FIG. 15 are photographs showing a state in the vicinity of a chisel after the deep hole machining using a triple-edged drill 101L with a thinning edge thickness H of 0.05 mm.
Figure 16:
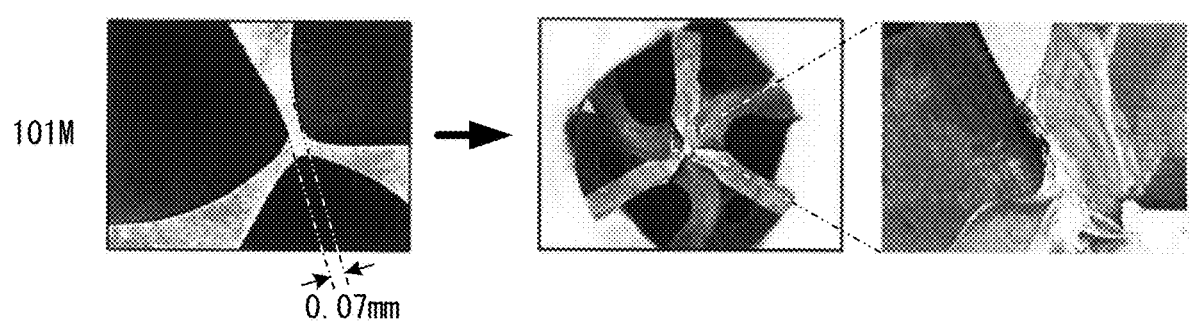
FIG. 16 are photographs showing a state in the vicinity of the chisel after the deep hole machining using a triple-edged drill 101M with the thinning edge thickness H of 0.07 mm.
Figure 17:
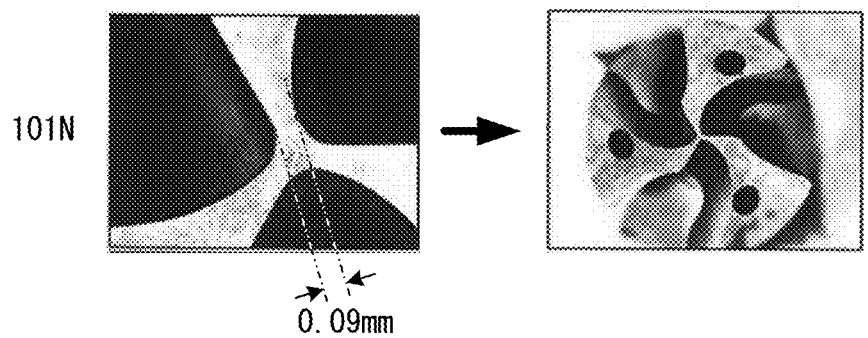
FIG. 17 are photographs showing a state in the vicinity of the chisel after the deep hole machining using a triple-edged drill 101N with the thinning edge thickness H of 0.09 mm.
Figure 18:
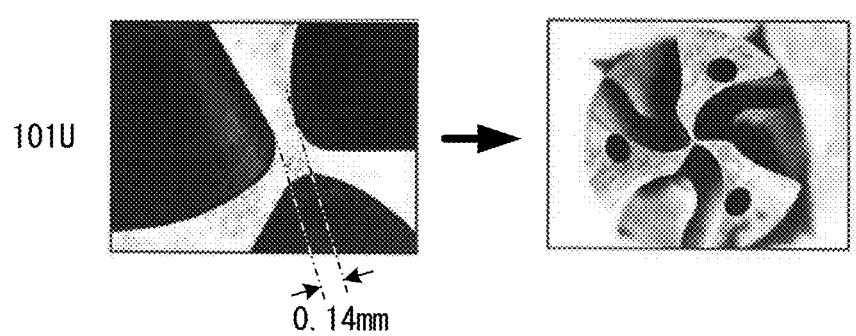
FIG. 18 are photographs showing a state in the vicinity of the chisel after the deep hole machining using a triple-edged drill 101U with the thinning edge thickness H of 0.14 mm.

Note that the eighth test was performed under the following conditions:
  Work material: Material equivalent to SCM440
  Machining depth: 300 mm
  Cutting speed 80 m/min
  Feed amount 0.35 mm/rev
  Radius of curvature R of circular arc grooves: 0.03D In the eighth test, after the 340 holes were successively formed, states of the leading end portions of the drills 101L, 101M, 101N, and 101U were compared. As shown in FIG. 15, the drill 101L having the thinning edge thickness H of 0.05 mm broke in the vicinity of the chisel. As shown in FIG. 16, the drill 101M having the thinning edge thickness H of 0.07 mm similarly broke in the vicinity of the chisel. As shown in FIG. 17, the drill 101N having the thinning edge thickness H of 0.09 mm was slightly worn, but there was no breakage in the vicinity of the chisel. As shown in FIG. 18, the drill 101U having the thinning edge thickness H of 0.14 mm was similarly slightly worn, but there was no breakage in the vicinity of the chisel. According to the results of the eighth test, it was verified that the sufficient durability performance could be secured as long as the thinning edge thickness H was 0.09 mm or more. Note that the larger the thinning edge thickness H, the more the rigidity in the vicinity of the chisel can be secured, but, in order to form the circular arc grooves, it is difficult to secure the thinning edge thickness H of 0.3 mm or more.

The invention claimed is:
1. A drill comprising:
   a drill main body configured to be rotated around a shaft center;
   a plurality of discharge grooves provided in a helical shape in an outer peripheral surface, from a leading end portion toward a base end portion of the drill main body;
   a cutting edge formed on a ridge section between an inner face of the discharge groove that is oriented toward a rotation direction side of the drill main body, and a flank of the drill main body at the leading end portion;
   a thinning edge provided at the leading end portion of the drill main body and extending from an inner end of the cutting edge toward a chisel portion that is a leading end section of the drill main body; and
   a gash portion, a ridge with respect to the flank extending in a circular arc shape from an inner end of the thinning edge, connecting to the discharge groove further to an inner peripheral side than the outer peripheral surface of the drill main body,
   wherein
   the gash portion includes a circular arc groove that have a circular arc shaped in a cross section, and that is provided in a section that connects a gash face of the gash portion and a thinning face which is a rake face and which connects the thinning edge and the discharge groove,
   the drill is a double-edged drill that is provided with two sets of the cutting edges, and when the drill main body is seen from the leading end, a gash furrow that indicates a distance, in a first direction, between a tangential line of one of the gash portions and a tangential line of an other of the gash portions, which follow a second direction orthogonal to the first direction along with a tangential line at the inner end of the thinning edge, is at least 0.02D and no more than 0.04D, where D is a diameter of the drill.

2. The drill according to claim 1, wherein a radius of curvature of the circular arc groove is at least 0.01D and no more than 0.03D.

3. A drill comprising:
a drill main body configured to be rotated around a shaft center;
a plurality of discharge grooves provided in a helical shape in an outer peripheral surface, from a leading end portion toward a base end portion of the drill main body;
a cutting edge formed on a ridge section between an inner face of the discharge groove that is oriented toward a rotation direction side of the drill main body, and a flank of the drill main body at the leading end portion;
a thinning edge provided at the leading end portion of the drill main body and extending from an inner end of the cutting edge toward a chisel portion that is a leading end section of the drill main body; and
a gash portion, a ridge with respect to the flank extending in a circular arc shape from an inner end of the thinning edge, connecting to the discharge groove further to an inner peripheral side than the outer peripheral surface of the drill main body, wherein the gash portion includes a circular arc groove that have a circular arc shaped in a cross section, and that is provided in a section that connects a gash face of the gash portion and a thinning face which is a rake face and which connects the thinning edge and the discharge groove, and the drill is a triple-edged drill that is provided with three sets of the cutting edges, and when the drill main body is seen from the leading end, a web thickness of the thinning edge that indicates a distance between a first tangential line of an inner edge of a target thinning edge that is one of three of the thinning edges and a second tangential line which follows an direction of the first tangential line of a target gash portion positioned closest to the target thinning edge, among the gash portions facing the other thinning edges different from the target thinning edge is at least 0.09 mm and no more than 0.3 mm.

* * * * *